June 8, 1965 G. W. DICK 3,188,497

SINGLE-TRANSISTOR CIRCUIT PRODUCING PULSE PREDETERMINED INTERVAL FROM TRAILING EDGE OF FINAL PULSE IN ANY PULSE-TRAIN

Filed May 29, 1963

INVENTOR
G.W. DICK
BY
Charles Scott Phelan
ATTORNEY 3,188,497
Patented June 8, 1965

3,188,497

SINGLE-TRANSISTOR CIRCUIT PRODUCING PULSE PREDETERMINED INTERVAL FROM TRAILING EDGE OF FINAL PULSE IN ANY PULSE-TRAIN

George W. Dick, Morris Township, Morris County, N.J., assignor to Bell Telephone Laboratories, Incorporated, New York, N.Y., a corporation of New York Filed May 29, 1963, Ser. No. 284,042
9 Claims. (Cl. 307—88.5)

Figure 1:
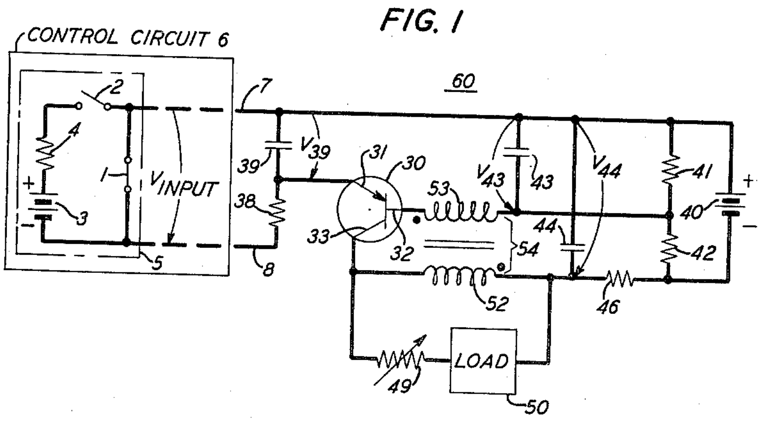

This invention relates to pulse generator circuits and, more particularly, to delayed pulse generator circuits for receiving input pulse trains consisting of single or plural pulses, and for producing in response thereto an output pulse that is delayed a predetermined interval from the trailing edge of the final pulse in any train of pulses.

Delayed pulse generator circuits often find use as control circuits in decoding equipment where the information to be decoded is represented in pulse form. This information to be decoded consists of information units in the form of several spaced pulses which make up a train of pulses and have a free time interval preceding and following each pulse train. Delayed pulse generator circuits, in such systems, are employed to monitor each pulse train and to produce an output signal following each train. This output signal controls other decoding equipment.

It is general practice in such systems to utilize one information unit solely as a "start" unit which indicates that a new series of information to be decoded follows this start signal. This start signal is generally a single-pulse input train which, as is true of the other information pulse trains, is also preceded and followed by free time intervals. In such decoding systems it has been necessary in the past to adjust the timing of one delayed pulse generator circuit so that it produces a delayed output control signal following only the "start" pulse. Further, an additional delayed pulse generator circuit was employed and adjusted to respond only to plural-pulse input trains. This approach required two separate delayed pulse generators and was inefficient. To overcome this inefficient operation, prior art circuits capable of monitoring both single-pulse and plural-pulse input trains have been employed.

These prior art circuits, capable of the dual monitoring operation mentioned above, are termed resettable delay flop circuits. Such circuits generally comprise input and output trigger circuits connected together by a timing circuit. The input trigger circuit is often a diode clamp circuit which, when overridden by a first input pulse, is employed to activate the timing circuit. After the first input is terminated the timing circuit starts a predetermined time-out cycle. At the end of this time-out cycle the output trigger circuit is activated and a delayed output is produced. This time-out occurs only if a free time interval follows the first input pulse. If, on the other hand, a second pulse of a plural-pulse input train arrives, the input trigger circuit recycles the timing device, and no output is produced because the time-out requisite for the operation of the output trigger circuit does not occur. An output will subsequently be generated when a free time interval following the plural-pulse input train appears.

These prior art resettable delay flop circuits generally require several transistors and numerous diodes. Such circuits are uneconomical and involve relatively complicated circuit structure. In addition, such circuits suffer from another drawback when employed in the type of system hereinbefore mentioned. Decoding systems of the type mentioned, when developed for industrial use, must be designed for placement in locations which are remote from centralized control and repair facilities.

When so placed, the equipment often is required to render service for long unattended periods and over a wide range of ambient temperatures. A delayed pulse generator, when employed in these systems, must therefore have a high degree of reliability and exhibit stability of performance. Inasmuch as the prior art circuits require numerous transistors and diodes, which are known to possess a sensitivity to wide variations in temperature, the chance of circuit failures increases with the number of such devices employed. Accordingly, the reliability and stability of these prior art circuits is questionable under such circumstances.

In addition, the prior art delay flop circuits referred to hereinbefore require, for plural-pulse input trains, considerable cycling and recycling of the timing circuit. The timing circuit often includes a transistor switching device which controls the timing cycles by transitions in its conductive state. In these prior art circuits it is possible for fluctuations in the input signals and adverse effects from changes in temperature to prevent one of the numerous transitions of conductive conditions in the switching device. Such an event, of course, causes an output signal to be produced at an incorrect time. For these reasons it is desirable in a delayed pulse generator to limit the number of temperature sensitive devices employed to a minimum. It is further desirable to limit the number of transitions of conductive states of a switching device for a plural-pulse input to a minimum number in order to achieve operating limits which are satisfactory in view of expected fluctuations in the spacing of the pulses forming the plural-pulse input train.

Accordingly, it is an object of this invention to produce a single delayed output pulse in response to input pulse trains of variable length, and to use, for the production of these single outputs, a minimum amount of equipment.

Another object of this invention is to produce a single delayed output in response to input trains of variable length, which output pulse is relatively independent of fluctuation in the spacing of pulses which make up the plural-pulse input trains applied thereto.

These and other objects are attained in one specific illustrative embodiment of a delayed pulse generator of my invention in which single-pulse and plural-pulse input trains charge a timing network connected to a switching device set normally in a first impedance condition. This timing network, in response to these pulse trains, places and holds the switching device in a second impedance condition for a time interval including, and in excess of, the time of appearance of the input train. During this second impedance condition, a potential source at the pulse generator charges an output storage device to a high potential level and charges a switch-control storage device to a lower control potential level. The timing network discharges during a free time interval following either a single-pulse or a plural-pulse input train to a potential less than the control potential, thereby causing the switching device to revert to its first impedance condition. This reversion completes a path in a blocking oscillator circuit employing this same switch for discharging the highly charged output storage device through a load. The operation of this oscillator controls the duration of the output signal produced, and thereafter automatically returns the generator to its normal condition.

Thus, my invention combines in a simple and efficient single-switch circuit a delayed pulse generator operation for producing an output pulse following either single-pulse or plural-pulse input trains. A comparable operation heretofore required, in the prior art circuits, a greater number of circuit components which generally involved more complicated circuit operation.

Accordingly, it is a feature of my invention that a switch normally set in one impedance condition in a delayed pulse generator is driven and held in a second impedance condition by a pulse-charged timing circuit for a time interval either in excess of the duration of a single-pulse input or in excess of the duration of a plural-pulse train. A pulse forming network, charged during the interval the switch is in the second impedance condition, is subsequently discharged through an output path established when such switch reverts to its original impedance condition.

It is another feature of my invention that when a switch in a delayed pulse generator reverts, during a free time interval following either a single-pulse or a plural-pulse input train, to its original impedance condition, an output discharge path is completed in a blocking oscillator circuit. This oscillator circuit includes the switch and is operative for forming the output pulse and automatically returning the delayed pulse generator circuit to normal.

Figure 2:
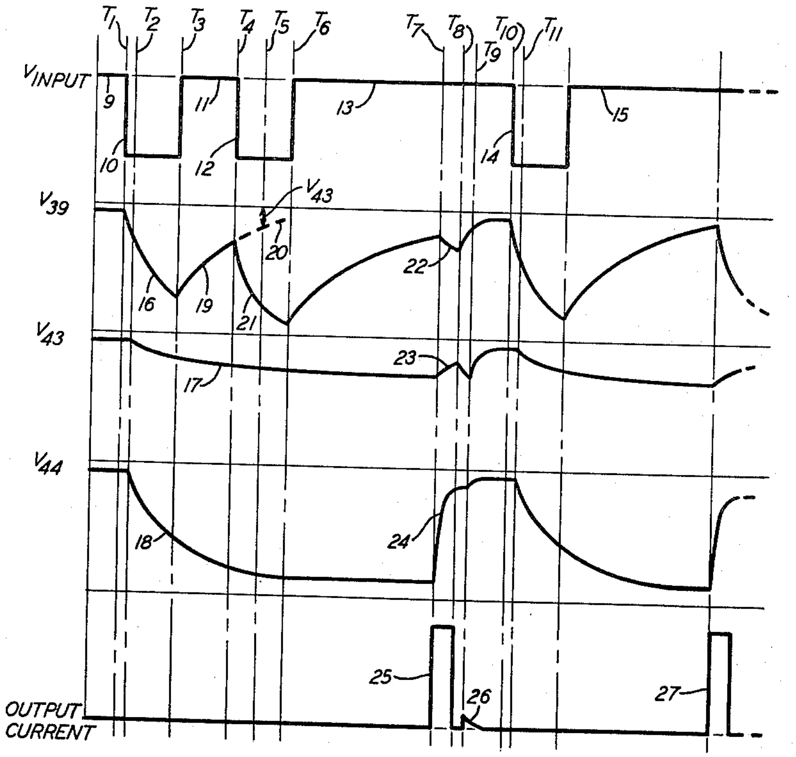

The foregoing objects and features of my invention will become more apparent to one skilled in the art from the detailed description of a specific embodiment of my invention when considered with the drawings, in which:

FIG. 1 is a circuit diagram of a single-transistor delayed pulse generator circuit embodying the present invention; and FIG. 2 depicts a pulse train and a series of waveforms useful in explaining the operation of the generator circuit of FIG. 1.

Referring to FIG. 1, a control circuit 6 is shown connected by dashed leads 7 and 8 to the delayed pulse generator 60 of this invention. The control circuit 6, which is advantageously remotely located from the delayed pulse generator, comprises a pulse train generator circuit 5 shown in dashed lines. A series of output pulses are produced by the generator 5 and are applied to the delayed pulse generator 60 by an input lead 7 and a return lead 8. This series of pulses may consist either of a single unidirectional pulse preceded and followed by a free time interval; or it may consist of plural unidirectional input pulses in a train, which train is also preceded and followed by a free time interval. The pulse train generating circuit 5 at control circuit 6 may be any normally low output impedance device capable of producing pulses in the pattern described. For example, such a generating circuit advantageously includes a potential source 3, a limiting resistor 4, and a standard telephone dial.

This telephone dial is symbolically represented in FIG. 1 by a normally closed switch 1 and a normally open switch 2 which represent contacts on a telephone dial mechanism. In the operation of a telephone dial, when the dial is wound to its stop, switch 1 and switch 2 are both closed. Switch 2 remains closed during the unwinding of the dial. However, as the dial unwinds, switch 1 opens and closes a number of times to form pulses representing the dialed digit. When the dial is fully unwound, switches 1 and 2 return to their normally closed and normally open conditions, respectively.

The potential source 3 and the limiting resistor 4 of dial pulse generator 5 cooperate with switches 1 and 2, operating in the manner just described, to form the dial pulses $V_{input}$ shown in FIG. 2. These $V_{input}$ pulses and the waveforms $V_{39}$, $V_{43}$, and $V_{44}$ of FIG. 2 are shown having a negative polarity with respect to a reference potential which is the potential of lead 7 of FIG. 1. This reference status of lead 7 is shown by the arrows of FIG. 1.

Pulses 10 and 12, shown in FIG. 2, are a coded representation for the dialed digit two and are separated by an interpulse interval 11. Under ideal conditions the pulse duration time and interpulse time are equal. In a practical application variations in the pulse duration time and the interpulse time exist. Proper choice of circuit components as described hereinafter prevent possible malfunctioning of the generator of FIG. 1 due to these variations.

In order to define each train of pulses as a separate information unit, an interval of free time in excess of the longest expected interpulse interval is chosen. This time interval between pulse trains, referred to hereinafter as a free time interval, precedes and follows each group of pulses representing one complete information unit. For example, in FIG. 2 the pulses 10 and 12, representing a dialed digit two, are preceded and followed by free time intervals 9 and 13. In a similar manner, pulse 14, representing a dialed digit one, is preceded and followed by free time intervals 13 and 15.

Input pulses, such as those shown in FIG. 2, are applied by leads 7 and 8 to the delayed pulse generator 60 of FIG. 1. As shown in FIG. 1, the intertrain pulse generator 60 comprises a junction transistor 30 of the PNP type having its input, or emitter, electrode 31 connected to return lead 8 through a resistor 38. Emitter electrode 31 is also connected to input lead 7 through a coupling capacitor 39. A source 40, having, for reasons explained hereinafter, a potential equal to the potential of source 3 of generator 5, is connected across a voltage divider which includes resistors 41 and 42.

The terminal of potential source 40 which is connected to resistor 41 is further connected to the emitter electrode 31 of transistor 30 via a direct current path, which includes lead 7, normally closed switch 1, lead 8 and resistor 38. The remaining terminal of source 40 is connected in another direct current path via a limiting resistor 46 and a winding 52 of transformer 54 to an output, or collector, electrode 33 of transistor 30. Winding 53 of transformer 54 connects the control, or base, electrode 32 of transistor 30 in a direct current path to the common junction of potential divider resistors 41 and 42. These paths, just described, complete bias circuits from potential source 40 to transistor 30. The bias provided by these circuits holds transistor 30 in a normally conductive condition in the manner described hereinafter.

Resistors 38, 41, 42, and 46 are chosen such that, in the absence of an input pulse, potential source 40 establishes a voltage at base electrode 32 of transister 30 which is negative with respect to a voltage established at emitter 31. Hence, transistor 30 is allowed to conduct quiescent current through a path which includes, from the positive terminal of source 40, lead 7, closed switch 1, lead 8, resistor 38, the emitter-collector path 31, 33 of transistor 30, winding 52, and resistor 46. Resistor 46 is chosen to have a resistance value in comparison with resistor 42 which develops a forward bias potential at collector 33 and base 32, which potential holds transistor 30 in a low quiescent current saturated condition. Resistor 46 is advantageously chosen to permit capacitor 44, upon a subsequent nonconductive condition in transistor 30, to reach its full charge level in approximately one and a half pulse times plus an interpulse interval; i.e., the interval $T_2$ through $T_5$. Load 50 and a series connected variable resistor 49 are connected in a parallel circuit with transformer winding 52. Essentially no quiescent current flows through this parallel load circuit, however, since winding 52 present a very low resistance and resistor 49 is adjusted to a higher resistance value. Thus, essentially all the quiescent current flows through winding 52 and only an insignificant amount of current flows through load 50.

Capacitor 39 and capacitors 43 and 44 are connected in the delayed pulse generator circuit so that the impedance conditions of transistor 30 regulate the charge levels thereof. The connection of capacitor 39 has been described hereinbefore. Capacitor 43, connected in parallel with resistor 41, is further connected to the emitter electrode 31 via switch 1 and resistor 38. Capacitor 43 is also connected to the base electrode 32 via transformer winding 53. Capacitor 44 is connected in series with resistor 46, which series circuit is further connected in parallel across the potential divider resistors 41 and 42. Capacitor 44 is also connected to the emitter 31 of transistor 30 through the same circuit described for capacitor 43 and is further connected to the collector electrode 33 via transformer winding 52.

Transistor 30, biased in the manner described hereinbefore, is saturated at a low quiescent current level and thus the collector-emitter impedance and the emitter-base impedance of transistor 30 are low. This low impedance condition of transistor 30 establishes a low charge level on capacitors 39, 43, and 44 for the following reason. Current flow from potential source 40 is through lead 7, closed switch 1, lead 8, resistor 38, the low impedance junctions of transistor 30 and resistor 46. This current flow established a large voltage drop across resistor 46 and a correspondingly low voltage drop across resistor 38 and the low impedance junctions of transistor 30. The low voltage drop across resistor 38 establishes a correspondingly low voltage across capacitor 39. This voltage drop across resistor 38 added to the low voltage drop across the emitter-base junction of transistor 30 establishes the voltage across capacitor 43. Capacitor 44 is charged to a low voltage level determined by the combined voltage drop across resistor 38, the emitter-base junction and the base-collector junction of transistor 30. The voltages developed across these capacitors are designated in FIG. 2 as $V_{39}$, $V_{43}$, and $V_{44}$, respectively. These voltages, with input lead 7 in FIG. 1 taken as a reference, are of the polarity and approximate relative magnitudes shown in FIG. 2 during free time interval 9.

In order to illustrate the circuit operation of delayed pulse generator 60, when input pulses are applied thereto, assume that a first train of two pulses 10 and 12 and a second single-pulse train 14 are applied to delayed pulse generator 60. This pulse train sequence, shown in FIG. 2, is generated by pulse train generator 5 in the manner described hereinbefore. Prior to a detailed discussion of the operation of delayed pulse generator 60 and the associated voltage waveforms $V_{39}$, $V_{43}$, and $V_{44}$ shown in FIG. 2, a brief outline of the circuit operation of the delayed pulse generator of my invention is in order.

Capacitor 39 and resistor 38 comprise an RC timing network which is in a complete circuit via leads 7 and 8 with pulse train generator 5. This timing network is alternately charged and discharged by the input voltage of source 3 which appears on lead 7. Shortly after the reception of an input pulse by generator 60, capacitor 39 charges to a level which drives transistor 30 nonconductive and establishes a high impedance condition thereat. This high impedance condition opens the low impedance loop which heretofore maintained the voltages across capacitors 43 and 44 at low levels. A charging process toward the voltages of source 40 which appear across voltage divider resistors 41 and 42, is thereafter instituted for these capacitors.

Capacitor 43 and voltage divider resistors 41 and 42 form a timing network which establishes, at the base of transistor 30, a bias or control voltage during the time interval in which transistor 30 is nonconductive. This voltage established across capacitor 43 is employed to achieve a reversion of transistor 30 to a low impedance condition during a free time interval at the termination of an input pulse train. During such a free time interval, capacitor 39 discharges below the voltage across capacitor 43 and a forward bias is thus established which returns transistor 30 to a conductive condition. Capacitor 44 is an output-producing storage device. During the time transistor 30 is nonconductive, capacitor 44 charges through resistor 46 to the terminal potential of source 40. The potential established across capacitor 44, subsequently produces an output pulse when transistor 30 reverts to a low impedance condition. This reversion of transistor 30 establishes an output-producing discharge path for capacitor 44 through a blocking oscillator circuit described in detail hereinafter. An oscillator action forms the output pulse, causes transistor 30 to become momentarily nonconductive, and then returns it to a normal quiescent current conducting condition. For the reason described more fully hereinafter no further output pulse is produced when transistor 30 resumes its normally quiescent condition.

Turning now to the detailed operation of delayed pulse generator 60, assume that pulses $V_{input}$ shown in FIG. 2 are applied thereto. Closure of switch 2 and the subsequent opening of switch 1 at time $T_1$, form the leading edge of pulse 10.

At this time potential from source 3 is applied via lead 7 to capacitor 39 which is in a complete circuit with source 3. Capacitor 43 is not in a complete circuit with source 3 because current from source 3 cannot pass in a reverse direction through the emitter-base junction of transistor 30. Thus, at time $T_1$ capacitor 39 starts to charge toward the terminal potential of source 3. Capacitor 43 remains at its original low charge quiescent potential. At time $T_2$ capacitor 39 has charged to a potential which is more negative than the potential of capacitor 43. Thus, the emitter-base junction of transistor 30 becomes back-biased and transistor 30 is rendered nonconductive.

With transistor 30 in a nonconductive high impedance condition at time $T_2$, capacitors 43 and 44 start to charge from their initial low values of quiescent potential toward higher potentials determined substantially entirely by source 40 and resistors 41 and 42. This charging process for capacitors 43 and 44 continues as long as transistor 30 is nonconductive or until they reach their maximum potentials. During time interval $T_2$ through $T_3$, capacitor 39 also continues to charge but it is charging toward the terminal potential of source 3 through its charging circuit described hereinbefore.

Since capacitor 43 charges toward a lower potential and at a slower charging rate than does capacitor 39, there is assurance that transistor 30 is held in a high impedance condition for the pulse interval $T_2$ through $T_3$. This difference in the charging cycles for capacitors 39 and 43, as shown by portions 16 and 17 of the voltage waveforms $V_{39}$ and $V_{43}$, respectively, insures that the voltage at emitter 31 of transistor 30 is negative with respect to the base 32 thereof. Thus, during the period $T_2$ through $T_3$, while input pulse 10 is present, transistor 30 is maintained in a nonconductive condition. During this nonconductive interval for transistor 30, capacitor 44 charges through resistor 46 toward the terminal potential of source 40. This charging process for capacitor 44 is shown by portion 18 of voltage waveform $V_{44}$. The charge on capacitor 44, during this nonconductive interval provides, in a manner to be described hereinafter, the energy for producing an output pulse when transistor 30, at a subsequent time, achieves a conductive condition.

At time $T_3$ switch 1 closes in order to form the trailing edge of pulse 10. With switch 1 in the closed condition indicated in FIG. 1, capacitor 39 discharges through resistor 38, leads 7 and 8 and closed switch 1. This discharge process for capacitor 39 is shown by the solid portion 19 of voltage waveform $V_{39}$ in FIG. 2.

It should be noted, in accordance with the solid portion 19 of $V_{39}$ and portion 17 of $V_{43}$, that when input pulse 12 appears at time $T_4$, the nonconductive condition for transistor 30 is maintained. This back-bias is maintained since capacitor 39, which controls the voltage of emitter electrode 31, has not, at time $T_4$, discharged to a voltage level less negative than the negative control voltage $V_{43}$, established at base electrode 32 by capacitor 43 which is charged by potential source 40 through the voltage dividing resistors 41 and 42. Thus, at time $T_4$, the voltage on emitter electrode 31 is more negative than the voltage on base electrode 32 and transistor 30 is held in a nonconductive condition throughout the time interval $T_3$ through $T_4$.

If, on the other hand, a free time interval, rather than input pulse 12, followed the trailing edge of pulse 10, capacitor 39 would continue to discharge beyond time $T_4$. This discharge of capacitor 39, shown by dashed portion 20 of voltage $V_{39}$, would at time $T_5$ establish a voltage at emitter electrode 31 less negative than $V_{43}$ established at base electrode 32 by capacitor 43. This voltage condition would forward bias transistor 30 and an output pulse would be generated in a manner which will be described hereinafter.

Inasmuch as a second pulse 12 appears at time $T_4$ and recharges capacitor 39, no forward bias is developed at this time and transistor 30 remains in a high impedance nonconductive condition. Prior to a description of the output pulse forming operation of delayed pulse generator 60 at free time interval 13, the preventive measures taken to assure that variations in the spacing of received pulses in a plural-pulse train cannot cause an incorrect output pulse should be noted.

To pick an example merely for purposes of illustration and not to be considered limiting in any manner, assume that variations in pulse spacing could cause interpulse intervals to vary from what would ideally be 50 milliseconds to a range of 30 to 70 milliseconds. A 30 millisecond interpulse interval increases the charging time available and decreases the discharge time available for capacitor 39. Accordingly, such a variation does not produce conditions which might lead to an erroneous output pulse and are of no concern.

An interpulse interval of 70 milliseconds, however, is of concern. Such a variation decreases the charging time available and increases the discharge time available for capacitor 39 and thus produces a situation in which the voltage across capacitor 39 might become less negative than the control voltage $V_{43}$ and cause an erroneous output to be developed. Under ideal conditions the time $T_4$ through $T_6$ for pulse 12 is 50 milliseconds. By choosing time $T_5$ at which $V_{39}$ would become less negative than $V_{43}$, at the midpoint of pulse 12, provision is made for an allowance of 25 milliseconds. This allowance provides a 5 millisecond safety interval which has proven sufficient for the 70 millisecond variation. Thus, for purposes of the illustrated example, were the interpulse interval 11 70 milliseconds in duration, capacitor 39 would not, prior to the appearance of pulse 12, discharge below the control voltage $V_{43}$ established by capacitor 43 at the base of transistor 30. Transistor 30 would thus remain in a high impedance condition.

As mentioned above, transistor 30 is in a nonconductive condition when input pulse 12 of FIG. 2 appears at time $T_4$. Pulse 12 causes capacitor 39 to charge via the circuit described hereinbefore. This charging, shown as portion 21 of voltage $V_{39}$, assures that a back-bias condition exists for transistor 30 during the presence of the dial pulse 12 and for a portion of the free time interval 13 following this pulse.

At time $T_6$ the trailing edge of pulse 12 is formed by the opening of switch 2 and the closure of switch 1. A free time interval 13 follows pulse 12 which is the last pulse in the input train. During this free time interval 13, a point is reached at which the remaining charge potential of capacitor 39 is less negative than the voltage $V_{43}$ established at the base electrode 32 by capacitor 43. This point is marked on FIG. 2 at time $T_7$. When this voltage condition is reached, transistor 30 is forward biased and becomes conductive.

When transistor 30 conducts, a discharge path is provided for capacitor 44. This discharge path for capacitor 44 includes lead 7, capacitor 39, emitter-collector path 31, 33 of transistor 30, and a parallel circuit comprising winding 52 in one branch and variable resistor 49 and load 50 in another branch thereof. As transistor 30 conducts initially, capacitor 44 starts to discharge through the path described. The establishment of this discharge path results in capacitor 44 establishing a voltage across transformer winding 52 which tends to bias transistor 30 fully conductive. In accordance with the polarity dots of transformer 54, the negative potential at the dot of transformer winding 52 appears, through standard transformer action, at base 32 of transistor 30, as a positive feedback voltage. This feedback voltage assures rapid saturation of transistor 30.

Transistor 30, capacitors 39, 43, and 44 and transformer 54, during this conductive interval for transistor 30, form a blocking oscillator circuit. The oscillator action of this circuit, as explained hereinafter, drives transistor 30 first into saturation, thereafter causes transistor 30 to become momentarily nonconductive, and returns transistor 30 to its quiescent current conducting condition.

At time $T_7$, with transistor 30 fully saturated, emitter, base, and collector electrodes 31, 32, and 33 comprise, in effect, a single low impedance connection. This single low impedance connection establishes an output-producing discharge path, described hereinbefore, for the highly charged capacitor 44. It was mentioned hereinbefore that when transistor 30 is conducting quiescent current, essentially all of this current flows through the low impedance of transformer winding 52, and a very small amount of current flows through load 50. An opposite current condition exists when capacitor 44 is discharging because essentially all the discharge current flows through the load and a very small amount flows through transformer winding 52. The sudden application of the output producing voltage $V_{44}$ of capacitor 44 across winding 52 results in the establishment thereat of an opposing voltage, and a high impedance to current flow through this winding. Thus, capacitor 44 rapidly discharges through the relatively low impedance of load 50. This rapid discharge of capacitor 44 is shown as portion 24 of voltage $V_{44}$ of FIG. 2. The initiation of this rapid discharge defines the leading edge of an output pulse 25. Winding 52 of transformer 54 is also in a current carrying path for capacitor 44 during this discharge process. Transformer 54 regulates the time duration of output pulse 25 and aids in defining the trailing edge of output pulse 25 as described hereinafter.

The voltage of capacitor 44 appears across the parallel circuit consisting of transformer winding 52 and the load circuit 50 in the manner discussed hereinbefore. In accordance with standard transformer action, winding 52, at the dotted end is at a negative potential and this negative potential appears at the dotted end of winding 53 as a forward bias feedback voltage for transistor 30. This voltage holds transistor 30 conductive for the duration of output pulse 25.

During the output pulse 25, capacitor 43 is provide with a discharge path which includes lead 7, capacitor 39, the low impedance emitter-base junction 31, 32 and transformer winding 53 back to capacitor 43. The discharge of capacitor 43 reduces the voltage at base electrode 32 as shown by portion 23 of the voltage waveform $V_{43}$. During this discharge process for capacitor 43, and capacitor 44, capacitor 39 is being charged. This charging of capacitor 39 is shown by portion 22 of voltage $V_{39}$ in FIG. 2. As shown in FIG. 2 these portions 22 and 23 of voltage $V_{39}$ and $V_{43}$, respectively, are in a direction tending to establish a back-bias potential across the emitter-base junction of transistor 30.

This back-bias voltage has no effect during the time output pulse 25 is being produced since the high feedback voltage from transformer 54 overrides the lower voltages established by capacitors 39 and 43. Transformer 54 is designed at saturate after a time interval equal to $T_7$ to $T_8$. Once saturated there is very little inductive coupling between windings 52 and 53. Thus, at time $T_8$, when most of the energy previously stored in capacitor 44 has discharged through the load circuit, and transformer 54 has saturated, there will not be any appreciable feedback voltage developed at base 32 of transistor 30. When this condition exists, the back-bias established by capacitors 39 and 43 drives transistor 30 nonconductive. This nonconductive condition in transistor 30 defines the trailing edge, at time $T_8$, of output pulse 25.

The nonconductive condition described above for transistor 30 is only of the short duration $T_8$ through $T_9$ since capacitor 43 charges, in the manner described hereinbefore, to a potential more negative than capacitor 39 and transistor 30 at time $T_9$ is again returned to a conductive state. The charges on capacitors 39, 43, and 44 are represented at time $T_9$ by voltage waveforms $V_{39}$, $V_{43}$, and $V_{44}$, respectively.

A second large drive pulse is not obtained when transistor 30, at time $T_9$, is returned to a conductive condition since capacitor 44, as shown by portion 24 of voltage waveform $V_{44}$, had been largely depleted of charge by the previous output pulse. Capacitor 44 cannot regain sufficient charge during the short turn-off of transistor 30 in interval $T_8$ through $T_9$, to produce a positive feedback voltage or an output pulse of significant size. A small pulse of output current, such as 26 at time $T_9$, may be formed by this subsequent discharge of capacitor 44. This current pulse 26 is sufficiently small that the load circuit does not respond thereto. The voltage conditions established across base 32 and emitter 31 of transistor 30 as a result of this second conductive state rapidly reach a level corresponding to the low quiescent current condition intially described. Thus, after time $T_9$ and prior to pulse 14 of a subsequent digit train, the intertrain pulse generator 60 returns to its normally quiescent current conducting condition.

Pulse 14 is a single-pulse input train followed by a free time interval 15. At the appearance of pulse 14 at time $T_{10}$, capacitor 39 starts to charge toward the terminal potential of source 3 in the manner described hereinbefore with respect to time $T_1$ for pulse 10. Transistor 30 is biased nonconductive at time $T_{11}$ by capacitor 39 charging to a potential more negative than the potential of capacitor 43. The operation of delayed pulse generator 60 proceeds thereafter in the manner described with respect to pulse 12 and the time interval of $T_4$ through $T_9$ and an output pulse 27 is produced. Transistor 30 thereafter reverts to its quiescent current conducting condition to await the next pulse train following free time interval 15.

The input pulses shown in FIG. 2, as produced by the pulse train generator 5, are negative going pulses. If, however, positive going pulses with respect to input lead 7 were employed by reversing the polarity of source 3, the principles of my invention are also applicable to these pulses. To adapt the delayed pulse generator 60 for these latter pulses, an NPN, rather than a PNP, transistor is required and the polarity of source 40 must be reversed.

It is to be understood that the above-described arrangements are illustrative of the application of the principles of my invention. Numerous other arrangements may be devised by those skilled in the art without departing from the spirit and scope of my invention.

What is claimed is:

1. A delayed pulse generator circuit comprising
a switch set in a first impedance condition,
an input source of pulses,
pulse train applying means connected between said switch and said input source for causing said switch, upon the appearance of one of said pulse trains, to assume a second impedance condition, said applying means including timing means for holding said switch in said second impedance condition for the duration of appearance of said one train and for a predetermined time interval thereafter,
a source of fixed potential,
an output-forming storage device connected to said source of fixed potential and chargeable thereby during the time interval said switch is in said second impedance condition, a load device connected in a circuit including said storage device and said switch,
and switch control means cooperaitng with said timing means for first operating said switch to a third impedance condition for discharging said storage device into said load device circuit at the conclusion of said predetermined time interval and for thereafter restoring said switch to said first impedance condition.

2. A delayed pulse generator circuit, in accordance with claim 1, wherein said switch comprises
a transistor having input, output and control electrodes, said control electrodes being connected to said control means and said input and said output electrodes being connected in said load device circuit for enabling said output-forming storage device to discharge through said load circuit.

3. A delayed pulse generator circuit, in accordance with claim 2, wherein said control means comprises
a first capacitor connected in parallel with said fixed source and chargeable to a predetermined biasing voltage during said time interval when said switch is in said second impedance condition.

4. A delayed pulse generator circuit, in accordance with claim 3, wherein said control means further comprises
a feedback transformer having a primary winding and a secondary winding,
means connecting said secondary winding to said control electrode of said transistor and said first capacitor,
and means connecting said primary winding between said output electrode of said transistor and said storage device and in a parallel circuit with said load, said transformer being responsive to said discharge of said storage device for controlling the interval of time during which said transistor controls current through said load device circuit.

5. A delayed pulse generator circuit, in accordance with claim 2, wherein said timing means comprises
a second capacitor connected at one terminal to said input source and connected at the other terminal to said input electrode of said transistor,
and resistive means completing a return path to said input source from said input electrode.

6. In a delayed pulse generator having an input means for receiving pulses grouped into trains consisting of a single-pulse or plural pulses as defined by a predetermined minimum free time interval preceding and following each train,
a transistor having input and control electrodes,
source means having a predetermined terminal voltage and biasing said transistor in a normally quiescent current conducting condition,
capacitive means connected between said input means and said input electrode for biasing said transistor nonconductive at the initial appearance of an input pulse train,
timing means including said capacitive means connected to said transistor for maintaining said transistor nonconductive during the appearance of all pulses in said input pulse train and for a predetermined portion of a free time interval following the trailing edge of the last pulse in such train,
control means connected between said input means and said control electrode and in parallel with said source means for biasing said transistor conductive after said predetermined portion of a free time interval, and
means connected to said transistor and responsive to the last-mentioned conductive condition therein for producing an output pulse.

7. A delayed pulse generator, in accordance with claim 6, wherein said transistor has an output electrode and wherein said output pulse producing means comprises
a second capacitive means connected at one terminal to said input means and in a parallel circuit with said source means, said second capacitive means being chargeable to the terminal voltage of said source means during said non-conductive condition of said transistor and dischargeable through said transistor during said last-mentioned conductive condition therein, a feedback transformer having a first and a second winding, a load device connected in a parallel circuit with said second winding, said first winding being connected between said control electrode of said transistor and said control means and said second winding being connected between said output electrode of said transistor and another terminal of said second capacitive means and inductively coupled with said first winding, said feedback transformer being saturated by the discharge of said second capacitive means through said parallel circuit of said second winding and said load device for establishing the duration of said output pulse and for returning said transistor to a high impedance condition, and means, including said second capacitive means, said control means, and said source means, operative following the saturation of said transformer for returning said transistor to said normally quiescent current conductive condition.

8. A delayed pulse generator circuit connected to an input source by a pair of leads normally shunted in the absence of an input pulse, said delayed pulse generator comprising a transistor having input, output and control electrodes, means for biasing said transistor in a normally low impedance condition, said biasing means comprising a source of fixed bias potential connected in a parallel circuit with a potential divider, a first direct current path between one lead of said pair of leads and one side of said parallel circuit, a first resistor connected between the remaining lead of said pair of leads and the input electrode of said transistor, a second direct current path comprising a second resistor connected between another side of said parallel bias circuit and the output electrode of said transistor, a third direct current path connecting said control electrode of said transistor to a portion of said potential divider, first, second and third storage devices each having two terminals, means connecting one terminal of all of said storage devices in common and to said first direct current path, the remaining terminal of said first storage device connected at the point of connection of said first resistor and said input electrode, the remaining terminal of said second storage device connected to said third direct current path, and the remaining terminal of said third storage device connected to said second direct current path at the point of connection of said second resistor and said output electrode, all of said storage devices being held at a low charge level by said low impedance condition in said transistor, and said second and third storage devices being chargeable by said bias source to a control and an output potential, respectively, when said transistor is subsequently placed in a high impedance condition, means for biasing said transistor in a high impedance condition comprising control means at said input source operable for removing said shunt from said pair of leads and for connecting a source of input potential in the place thereof to charge said first capacitive means, and means for causing said transistor to revert to a low impedance condition for completing a discharge circuit for said third storage device, the last-mentioned means comprising said control means at said input pulse source being further operable for removing said input source and for replacing said shunt across said pair of leads for a time interval sufficient to discharge said first storage device below said control potential of said second storage device, a load device connected to said output electrode and said remaining terminal of said third storage device for completing a path for discharge current from said third storage device, and a feedback transformer having a primary winding connected in said second direct current path and in parallel with said load, and a secondary winding connected in said third direct current path between said control electrode and said second storage device, said feedback transformer being saturable in response to said discharge current for determining the duration of an output pulse.

9. A delayed pulse generator circuit connected by a pair of leads to a pulse train generator circuit having a source of input potential connectable through a normally open switch to one of said leads and connected to the other of said leads, a normally closed switch located between said first switch and said delayed pulse generator and connected in shunt across said leads, said switches selectively operable for applying a train of pulses to said delayed pulse generator and thereafter returning to their normal positions during a free time interval, said delayed pulse generator circuit comprising a first resistive and capacitive means connected in a series circuit across said pair of leads, a transistor having emitter, base and collector electrodes, said emitter electrode being connected to a portion of said series circuit common to said first resistive and capacitive means, a source of bias potential connected in a parallel circuit with a potential divider, means for biasing said transistor in a normally low impedance condition including a first direct current circuit connected from one terminal of said parallel bias circuit to said emitter electrode through said leads, said normally closed switch, and said first resistive means, and a second direct current circuit from the other terminal of said parallel bias circuit to said collector electrode, and means connecting said base electrode of said transistor to a portion of said potential divider, second and third capacitive means, said second capacitive means being connected across said connecting means and said first direct current circuit and in parallel with said portion of said potential divider, said third capacitive means being connected across said first and second direct current circuits and in parallel with said source of bias potential, said transistor being responsive to said selectively operated switches for assuming and holding a high impedance condition only for a predetermined interval and reverting thereafter to a low impedance condition, a load device, and means connecting said load device to said output electrode of said transistor and said third capacitive means whereby said load device is activated upon reversion of said transistor to said low impedance condition.

References Cited by the Examiner

UNITED STATES PATENTS 2,719,226 9/55 Gordon et al. ----- 328—63 XR

ARTHUR GAUSS, *Primary Examiner.*